US011518861B2

(12) United States Patent
Brown et al.

(10) Patent No.: US 11,518,861 B2
(45) Date of Patent: Dec. 6, 2022

(54) TEAR RESISTANT MONO-AXIALLY ORIENTED PROPYLENE-BASED FILM

(71) Applicant: TORAY PLASTICS (AMERICA), INC., N. Kingstown, RI (US)

(72) Inventors: Matthew H. Brown, Wakefield, RI (US); Harold Egon Koehn, North Kingstown, RI (US); Claudio M. Paulino, South Kingstown, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 1022 days.

(21) Appl. No.: 16/224,904

(22) Filed: Dec. 19, 2018

(65) Prior Publication Data
US 2019/0153183 A1 May 23, 2019

Related U.S. Application Data

(62) Division of application No. 15/054,752, filed on Feb. 26, 2016, now Pat. No. 10,696,810.

(60) Provisional application No. 62/133,069, filed on Mar. 13, 2015.

(51) Int. Cl.
| | | |
|---|---|---|
| *C08J 9/06* | (2006.01) |
| *B29C 48/08* | (2019.01) |
| *B29C 48/00* | (2019.01) |
| *B29C 48/21* | (2019.01) |
| *B32B 27/08* | (2006.01) |
| *B32B 27/20* | (2006.01) |
| *B32B 27/32* | (2006.01) |
| *B32B 27/18* | (2006.01) |
| *B29C 55/06* | (2006.01) |
| *B29K 23/00* | (2006.01) |
| *B29L 7/00* | (2006.01) |

(52) U.S. Cl.
CPC ............. *C08J 9/06* (2013.01); *B29C 48/0012* (2019.02); *B29C 48/08* (2019.02); *B29C 48/21* (2019.02); *B29C 55/06* (2013.01); *B32B 27/08* (2013.01); *B32B 27/18* (2013.01); *B32B 27/205* (2013.01); *B32B 27/32* (2013.01); *B29K 2023/10* (2013.01); *B29L 2007/007* (2013.01); *B32B 2264/101* (2013.01); *B32B 2264/102* (2013.01); *B32B 2264/12* (2013.01); *B32B 2270/00* (2013.01); *B32B 2307/308* (2013.01); *B32B 2307/414* (2013.01); *B32B 2307/516* (2013.01); *B32B 2307/54* (2013.01); *B32B 2307/5825* (2013.01); *B32B 2307/732* (2013.01); *B32B 2307/734* (2013.01); *B32B 2405/00* (2013.01); *B32B 2553/00* (2013.01); *C08J 2323/12* (2013.01)

(58) Field of Classification Search
CPC ..... C08J 9/06; C08J 2323/12; B29C 48/0012; B29C 48/08; B29C 48/21; B29C 55/06; B32B 27/08; B32B 27/18; B32B 27/205; B32B 27/32; B32B 2007/007; B32B 2264/101; B32B 2264/102; B32B 2264/12; B32B 2270/00; B32B 2307/308; B32B 2307/414; B32B 2307/516; B32B 2307/54; B32B 2307/5825; B32B 2307/732; B32B 2307/734; B32B 2405/00; B32B 2553/00; B29K 2023/10; B29L 2007/007
USPC ........................................................ 264/4.1
See application file for complete search history.

(56) References Cited

U.S. PATENT DOCUMENTS

| | | | |
|---|---|---|---|
| 2,750,030 A | 6/1956 | Tierney | |
| 2,753,284 A | 7/1956 | Pahl et al. | |
| 4,905,888 A | 3/1990 | Suoss et al. | |
| 5,069,953 A | 12/1991 | Kishikawa et al. | |
| 7,144,635 B2 | 12/2006 | Hawes et al. | |
| 2002/0155277 A1* | 10/2002 | Ishige | B41M 5/52 428/335 |
| 2003/0041964 A1 | 3/2003 | Schwertfeger | |
| 2003/0105176 A1 | 6/2003 | Haas et al. | |
| 2006/0024518 A1 | 2/2006 | Kong et al. | |
| 2009/0029144 A1 | 1/2009 | Borgsten et al. | |
| 2011/0285048 A1 | 11/2011 | Barger et al. | |
| 2014/0147657 A1* | 5/2014 | Brown | B29C 71/02 428/315.5 |
| 2014/0322463 A1 | 10/2014 | Bashir et al. | |

FOREIGN PATENT DOCUMENTS

| | | |
|---|---|---|
| WO | 03-031713 | 4/2003 |
| WO | 2008/008875 | 1/2008 |
| WO | 2013/152287 A1 | 10/2013 |

OTHER PUBLICATIONS

Brown et al., U.S. Office Action dated Oct. 29, 2019, directed to U.S. Appl. No. 15/054,752; 10 pages.
Brown et al., U.S. Office Action dated May 3, 2019, directed to U.S. Appl. No. 15/054,752; 10 pages.
Brown et al., U.S. Office Action dated Oct. 1, 2018, directed to U.S. Appl. No. 15/054,752; 15 pages.
European Office Action dated May 9, 2018, directed to EP Application No. 16160114.1; 5 pages.
Extended European Search Report dated Jul. 22, 2016, directed to EP Application No. 16160114.1; 8 pages.

* cited by examiner

*Primary Examiner* — Hannah J Pak
(74) *Attorney, Agent, or Firm* — Morrison & Foerster LLP

(57) ABSTRACT

Described is a mono-axially oriented polyolefin film including a core or base layer containing a plurality of voids formed by a cavitating agent, wherein the film is oriented at least 4 times in the machine direction, and exhibits excellent tear resistance in the transverse direction.

17 Claims, 2 Drawing Sheets

TEAR RESISTANT MONO-AXIALLY ORIENTED PROPYLENE-BASED FILM

CROSS-REFERENCE TO RELATED APPLICATION

This application is a divisional of U.S. patent application Ser. No. 15/054,752, filed Feb. 26, 2016, which claims the benefit of U.S. Provisional Application Ser. No. 62/133,069, filed Mar. 13, 2015, the entire contents of each of which is incorporated herein by reference.

FIELD OF THE INVENTION

This invention relates to a mono-axially oriented propylene-based film which exhibits excellent tear resistance and methods of making the same. More particularly, this invention relates to a mono-axially oriented, voided film that exhibits excellent tear resistance formed from the blending of a voiding agent.

BACKGROUND OF THE INVENTION

Polymeric-based films can be used to form tapes for strapping heavy and bulky articles such as cartons. In addition, polymeric-based films can be used to reinforce other substrates such as corrugated cardboard, cardboard or paperboard backings for blister packages, boxes, or envelopes. Furthermore, polymeric-based films can be used as, or incorporated as part of, handles for carrying cartons, boxes, bags, or other bulk containers. Polymeric-based films can also be used as substrates for adhesive-coated tapes and narrow-width strips ("weaving tapes") that can be used in woven articles such as sacks, bags, baskets, geo-textiles, geo-grids, fabrics, and self-reinforced composites.

For example, U.S. Pat. No. 2,750,030 describes a high strength pressure-sensitive adhesive strapping tape with a lengthwise tensile strength of at least 300 lbs/in. The tape has a high cross-wise tear strength and a thickness of 5-20 mil. The tape has a film or paper backing coated with a tacky rubber-resin pressure-sensitive adhesive which contains an embedded monolayer of loosely-twisted or non-twisted yarns of continuous hair-like glass filaments that extend continuously from one end of the tape to the other. The cross-wise tear strength of the tape is due to the presence of the glass filaments aligned length-wise.

U.S. Pat. No. 2,753,284 describes a lineally reinforced, high-tensile adhesive tape for strapping tape applications and has a tensile strength of at least 100 lbs/in. The tape has a paper sheet with two layers of a rubber-resin type pressure-sensitive tacky adhesive in which mono-fiber hair-like glass filaments are embedded between the two tacky adhesive layers. A non-tacky third adhesive layer is coated over the outermost tacky adhesive layer. The cross-wise tear strength of the tape is due to the presence of the glass filaments aligned linearly.

U.S. Pat. No. 4,905,888 describes a handle for packages or cartons comprising strap-type foldable carrying tape. The strap-type carrying tape is preferably formed from a pressure-sensitive adhesive tape and can be made of woven natural or synthetic fibers. The carrying tape can also be reinforced with filament fibers or strips for tear resistance.

U.S. Pat. No. 7,144,635 describes a tear-resistant laminate comprised of paper or paperboard substrate, an adhesive layer, a tear-resistant layer secured to the adhesive layer, and a heat-sealable layer. The tear-resistant layer has a tear strength of at least 300 gf in both machine and cross-direction as measured by Elmendorf tear propation test. The tear-resistant layer is a polymeric material and can be biaxially oriented films such as polyester, nylon, polyolefin, or high density polyolefins such as metallocene-catalyzed polyethylene.

U.S. patent application Ser. No. 14/364,677 (US publication number US 2014/0322463) describes a uni-directionally oriented film comprised of a thermoplastic polyester and a polycarbonate. This type of film can be used for strapping of cartons, boxes, pallets, etc., and may be used as a weaving tape for woven bags, sacks, and containers. Preferably, the polyester is a polyethylene terephthalate (PET) resin. Polycarbonate is blended into the PET film as a minority component to reduce the tendency of such PET unidirectionally oriented films from splitting along the machine direction axis and imparts some impact toughness.

SUMMARY OF THE INVENTION

Described is a novel polyolefin-based, monoaxially (or uni-axially) oriented film that can be suitable for strapping tape applications and/or other applications requiring high tear resistance. In some embodiments, the film can have a high resistance to cross-direction (or transverse direction, TD) tearing and can have a machine direction (MD) tensile strength of greater than about 75, 80, 85, or 90 lbs/inch width and less than about 130, 120, 115, 110 or 100 lbs/inch width. Preferably, the polyolefin can be a propylene-based polymer. The tear resistance may be imparted by voiding of the film in which the voids interrupt or halt tear propagation through the film. Without being bound by any theory, it is believed that the voids provide termination points for crack/tear propagation and redirects the energy of the tear propagation from cross-wise (or transverse-wise) perpendicularly to the machine direction (along the direction of the monoaxial orientation) as depicted by FIG. 1. It is also believed that the size and shape of these voids can play a role in the effectiveness of terminating tear propagation, with smaller, more ovoid or oblong voids being preferred. This can result in a film with very high cross-wise or transverse direction tear resistance without using machine-direction aligned and embedded fibers or filaments to impart transverse direction tear resistance as in the prior arts. In particular, the inventors have found that the disclosed films exhibit very good transverse tear resistance even if the film is nicked or cut on the edges of the film to initiate a transverse tear.

The described films may be simpler to produce than typical films and tapes. In some embodiments, the films can be produced without requiring the use—or additional processing steps—of embedding fibers or filaments. Because the film may not include any foreign matter such as glass fibers, the film can be more suitable for recycling scrap or spent material for other uses or as part of the production of new strapping tape.

In an embodiment, a single layer film may be extruded and mono-axially oriented in the machine direction. This single layer can be voided, which provides the transverse direction tear resistance. In additional multi-layer film embodiments, it is contemplated to coextrude one or more skin layers on one or both sides of a void-containing core or base layer which is mono-axially oriented in the machine direction. This voided core layer can provide the transverse direction tear resistance properties of the multi-layer film. Further embodiments include voiding of the coextruded skin layers or intermediate layers adjacent to the core layer as well. It can also be contemplated to void the skin layers for tear propagation resistance while leaving the core layer un-voided. However, the core layer can be the preferred layer for voiding as it represents the bulk of the film mass and the bulk of the voids to terminate crack/tear propagation. It can be preferred that the coextruded skin layers be un-voided to provide smoother outer surfaces more suitable for printing, laminating, coating, metallizing, or other process handling. Other embodiments of the disclosed films can include laminating the disclosed films to other substrates including, but not limited to: other unvoided polymeric films or articles, paper-containing substrates, cardboard-containing substrates, fabric textiles, non-woven textiles, meshes, tapes, etc.

Voiding of the disclosed films can be accomplished by several means, including but not limited to: 1) cavitating agents such as inorganic particles like $CaCO_3$, $TiO_2$, silica particles, glass micro-beads; 2) cavitating agents such as organic polymeric materials like polybutylene terephthalate, nylons, polycarbonates, polystyrenes, polymethylmethacrylate; 3) beta-nucleation of the propylene-based polymer; 4) chemical foaming agents; or 5) combinations of the above. A preferred embodiment can be to use chemical foaming agents which provide relatively large voids or closed-cell cavities in which there is no physical particle residing within said void. Such an embodiment can help reduce the overall density of the voided film in comparison to a voided film using inorganic or polymeric cavitating agents wherein such cavitating agents add their intrinsic material density to the overall film density.

The film can also incorporate optional amounts of additives, including but not limited to: antiblock additives, slip additives, coloring agents/pigments, antistatic additives, UV-light absorbing or blocking additives, fire retardant additives.

Embodiments of a mono-axially oriented polyolefin film may comprise a core layer containing a plurality of voids. The film is oriented at least 4 times in the machine direction, and exhibits excellent tear resistance in the transverse direction.

In some embodiments, the film comprises at least one skin layer. The at least one skin layer may be voided or unvoided. In some embodiments, the core layer comprises a propylene-based polymer.

In some embodiments, the core layer comprises $CaCO_3$, $TiO_2$, silica particles, or glass micro-beads inorganic voiding particles. In some embodiments, the core layer comprises polymeric cavitating or voiding agents such as polybutylene terephthalate, nylon, polycarbonate, polystyrene, or polymethylmethacrylate. In some embodiments, the core layer comprises a propylene-based polymer and beta-nucleation of the propylene-based polymer to form a plurality of voids. In some embodiments, the core layer comprises a chemical foaming agent as the voiding agent.

In some embodiments, the film has a machine direction (MD) tensile strength of greater than about 75 lbsf/linear inch width, greater than about 85 lbsf/linear inch width, greater than about 95 lbsf/linear inch width, or greater than about 100 lbsf/linear inch width. In some embodiments, the film has a machine direction tensile strength of about 75-130 lbsf/linear inch width, about 85-130 lbsf/linear inch width, about 95-130 lbsf/linear inch width, or about 100-130 lbsf/linear inch width.

In some embodiments, the film is a mono-layer film and has a thickness of 1.5-10.0 mil (37.5-250 μm) or 2.5-5.0 mil before foaming and a thickness of about 2.5-18.5 mil (62.5-462.5 μm) or 3.0-5.0 mil after foaming.

In some embodiments, the film is a multi-layer film and has a thickness of 1.5-10.0 mil (37.5-250 μm) or 2.5-5.0 mil before foaming and a thickness of about 2.5-18.5 mil (62.5-462.5 μm) or 3.0-5.0 mil after foaming. In some embodiments, the core layer or film has a light transmission % of about 10-50% or about 20-40%.

In some embodiments, the film has a machine direction heat shrinkage of less than 8%, preferably less than 5%, and more preferably less than 2%.

An embodiment of a tape comprises a mono-axially oriented polyolefin film comprising a core layer containing a plurality of voids, wherein the film is oriented at least 4 times in the machine direction and exhibits excellent tear resistance in the transverse direction.

An embodiment of a method of making a mono-axially oriented polyolefin film comprises extruding a film comprising a layer, wherein the layer comprises a polyolefin (e.g., a propylene-based polyolefin) and a voiding agent, and orienting the film at least 4 times in the machine direction, wherein the film exhibits excellent tear resistance in the transverse direction.

In some embodiments, the method further comprises heat setting the extruded film. In some embodiments, the method further comprises co-extruding at least one skin layer that may not include a voiding agent with the core layer. In some embodiments, the method forms a monolayer film.

In some embodiments, a mono-axially oriented polyolefin film is described that comprises a layer comprising a propylene-based polymer and a plurality of voids formed by a voiding agent, wherein the film is oriented at least 4 times in the machine direction.

The voiding agent can be a chemical foaming agent and can comprises 0.2-3 wt % of the layer. In some embodiments the density of the film is 0.60-0.89 $g/cm^3$ and the average void size of the plurality of voids can be 5000-12000 μm in width along the MD axis. The standard deviation of the average void width can be 2000 μm or less. In some embodiments, the film can have a thickness of 1.5-10 mil before foaming and a thickness of 2.5-18.5 mil after foaming. In some embodiments, the film comprises at least one skin layer and the skin layer can be unvoided.

In some embodiments, the voiding agent comprises 1-10 wt % of the layer. In some embodiments, the voiding agent comprises $CaCO_3$, $TiO_2$, silica particles, or glass micro-beads inorganic void particles, polybutylene terephthalate, nylon, polycarbonate, polystyrene, or polymethylmethacrylate, or a beta-nucleation of the propylene-based polymer, In some embodiments, the film has a tensile strength of 80-120 lbs/inch width, a machine direction shrinkage of less than 2%, and/or a light transmission of 20-40%. In some embodiments, the film is a mono layer film.

In some embodiments, a tape is described that comprises the films disclosed herein. Specifically, the tape can include a layer comprising a propylene-based polymer and a plurality of voids formed by a voiding agent, wherein the film is oriented at least 4 times in the machine direction.

It is understood that aspects and embodiments of the films described herein include "consisting" and/or "consisting essentially of" aspects and embodiments. For all methods, films, and other aspects described herein, the methods, films, and other aspects can either comprise the listed components or steps, or can "consist of" or "consist essentially of" the listed components or steps. When a method, film, and other aspect is described as "consisting essentially of" the listed components, method, film, and other aspect contains the components listed, and may contain other components which do not substantially affect the performance of the method, film, and other aspect, but either do not contain any other components which substantially affect the performance of the method, film, and other aspect other than those components expressly listed; or do not contain a sufficient concentration or amount of the extra components to substantially affect the performance of the method, film, and other aspect. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

BRIEF DESCRIPTION OF THE DRAWINGS

Exemplary embodiments of the invention are described with reference to the accompanying Figures, in which.

DETAILED DESCRIPTION OF THE INVENTION

Figure 1:
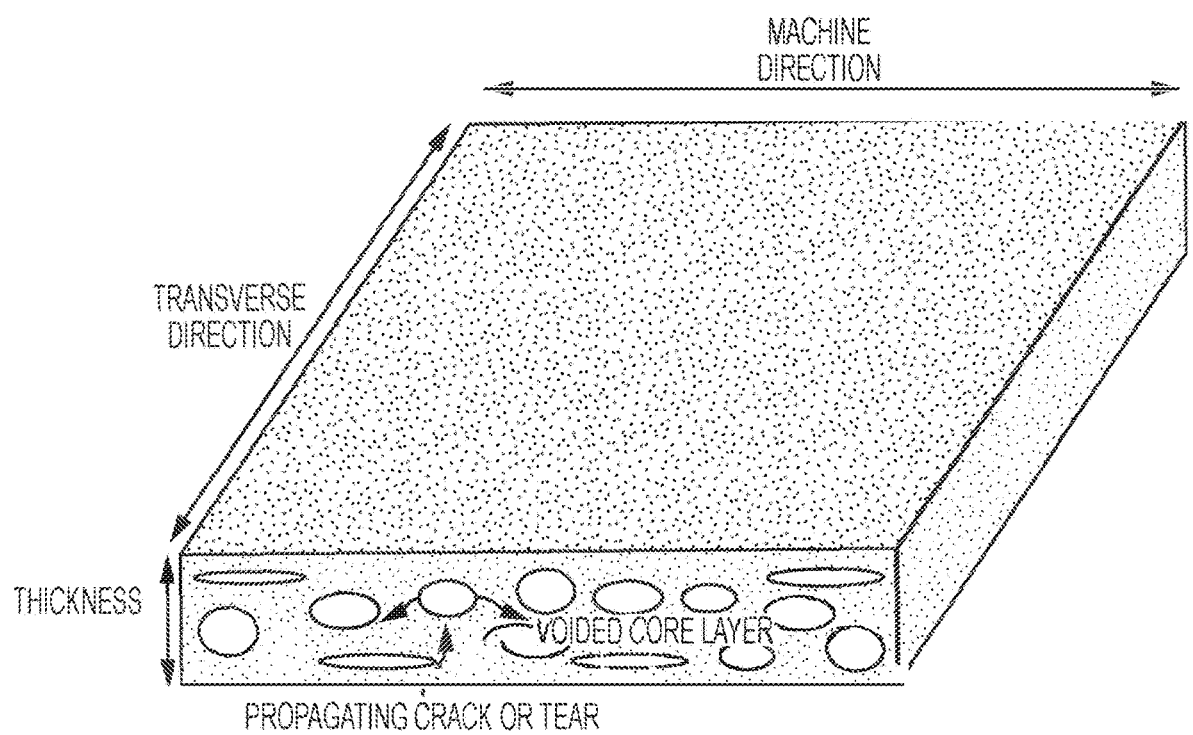
FIG. 1 is an illustrative embodiment of a voided mono-axially oriented polyolefin film that exhibits excellent tear resistance.

Described are mono-axially oriented propylene-based films that exhibit excellent tear resistance and methods of making the same. In some embodiments, the films can be produced by blending a cavitating or foaming agent to produce a voided film which is mono-axially oriented. The resulting film has surprisingly good tear resistance properties in the direction perpendicular to the orientation direction. Such an inventive film lends itself well to applications such as, but not limited to: strapping tape for boxes, cartons, pallets, textile bales; corrugated cardboard reinforcements; blister package board packaging; tape fabric; and carrying handles for cartons, boxes, and the like; or any applications requiring tear resistance properties. The disclosed films may be woven to produce a fabric for use in making sacks, bulk containers, carpet backing, signage, geo-textiles, and self-reinforced fabrics. The disclosed films may be tinted or colored to match consumer attributes for packaging or cartoning.

The film or layer may comprise, consist or consist essentially of the following materials: 1) a polyolefin or polyolefin blend (for example, a blend comprising one or more propylene homopolymers and copolymers); 2) a voiding agent; and 3) optional additives, including but not limited to: antiblock additives, slip additives, coloring agents/pigments, antistatic additives, UV-light absorbing or blocking additives, fire retardant additives.

Suitable polyolefins can be propylene-based polymers such as isotactic crystalline propylene homopolymers and "mini-random" isotactic crystalline ethylene-propylene copolymers. "Mini-random" propylene homopolymers are those class of ethylene-propylene copolymers in which the ethylene content is fractional, i.e. less than 1 wt %, typically on the order of about 0.2-0.8 wt %, and preferably about 0.5-0.7 wt %, of the polymer. These crystalline isotactic polypropylenes are generally described as having an isotactic content of about 90% or greater as measured by $C^{13}$ NMR. Suitable examples of crystalline propylene homopolymers are Total Petrochemicals 3271, 3274, and 3373HA; Phillips CH016, CH020, and CR035; and Braskem FF018. These resins can also have melt flow rates of about 0.5 to 5 g/10 min at 230°, a melting point of about 160-165° C., a crystallization temperature of about 108-126° C., a heat of fusion of about 86-110 J/g, a heat of crystallization of about 105-111 J/g, and a density of about 0.90-0.91. Higher isotactic content propylene homopolymers (i.e. "high crystalline" homopolymers) may also be used. Suitable examples of these include those made by Total Petrochemicals 3270 and 3273 grades, Braskem grade HR020F3, and Phillipps 66 CH020XK. These high crystalline polypropylenes typically have an isotactic content of 93% or greater as measured by $C^{13}$ NMR spectra obtained in 1,2,4-trichlorobenzene solutions at 130° C. The % percent isotactic can be obtained by the intensity of the isotactic methyl group at 21.7 ppm versus the total (isotactic and atactic) methyl groups from 22 to 19.4 ppm. These resins can also have melt flow rates of about 0.5 to 5 g/10 min, a melting point of about 163-167° C., a crystallization temperature of about 108-126° C., a heat of fusion of about 86-110 J/g, a heat of crystallization of about 105-111 J/g, and a density of about 0.90-0.91.

Other suitable polyolefins can be propylene-containing copolymers such as ethylene-propylene copolymers, propylene-butene copolymers, ethylene-propylene-butene copolymers, including propylene-containing impact copolymers, and blends thereof. It can also be contemplated to blend propylene homopolymers, mini-random homopolymers, and copolymers as desired. Exemplary propylene-containing copolymers can include: Total Petrochemicals Z9421 ethylene-propylene random copolymer elastomer of about 5.0 g/10 min melt flow rate (MFR) at 230° C., melting point of about 120° C., density 0.89 g/cm³, and ethylene content of about 7 wt % of the polymer; Total Petrochemicals 8473 ethylene-propylene random copolymer of about 4.0 MFR at 230° C. and ethylene content of about 4.5 wt % of the polymer; Sumitomo Chemical SPX78R1 ethylene-propylene-butene random copolymer of about 9.5 g/10 min MFR at 230° C., ethylene content of about 1.5 wt %, and butene content of about 16 wt % of the polymer; or ExxonMobil Chemical Vistamaxx™ ethylene-propylene random copolymer elastomers such as grade 3980 FL with an MFR of about 8.3 g/10 min at 230° C., Vicat softening point of about 80° C., melting point of about 79° C., density of about 0.879 g/cm³, and ethylene content of about 8.5 wt %. Other suitable propylene-based copolymers and elastomers may be contemplated including but not limited to: metallocene-catalyzed thermoplastic elastomers like ExxonMobil's Vistamaxx™ 3000 grade, which is an ethylene-propylene elastomer of about 11 wt % ethylene content, 8 g/10 min MFR at 230° C., density of 0.871 g/cm³, $T_g$ of −20 to −30° C., and Vicat softening point of 64° C.; or ethylene-propylene alpha-olefin copolymer plastomers of Dow Chemical's Versify™ grades, such as grade 3300, which is an ethylene-propylene plastomer of about 12 wt % ethylene content, 8 g/10 min MFR at 230° C., density of 0.866 g/cm³, $T_g$ of −28° C., and Vicat softening point of 29° C.; and Mitsui Chemicals Tafmer™ grades XM7070 and XM7080 metallocene-catalyzed propylene-butene random elastomers of about 22 and 26 wt % butene content, respectively. The Mitsui Tafmer grades are characterized by a melting point of 75° C. and 83° C., respectively; a Vicat softening point of 67° C. and 74° C., respectively; a density of 0.883-0.885 g/cm³; a $T_g$ of about −15° C.; a melt flow rate at 230° C. of 7.0 g/10 minutes; and a molecular weight of 190,000-192,000 g/mol. Exemplary impact copolymers can be an isotactic ethylene-propylene copolymer with an ethylene-propylene rubber content of about 10-30 wt % of the polymer wherein the ethylene content of the rubber is about 10-80 wt % of the rubber. Typically, the impact copolymer is manufactured in two reactors. In the first reactor, propylene homopolymer is produced and it is conveyed to the second reactor that also contains a high concentration of ethylene. The ethylene, in conjunction with the residual propylene left over from the first reactor, copolymerizes to form an ethylene-propylene rubber. The resultant product has two distinct phases: a continuous rigid propylene homopolymer matrix and a finely dispersed phase of ethylene-propylene rubber particles. The rubber content that is typically used is in the 10-30 wt % range depending on the desired end-use properties. It is this mixture of two phases—the propylene homopolymer matrix and the dispersed phase of ethylene-propylene rubber—that provides the impact resistance and toughening properties that impact copolymers are known for. Ethylene-propylene impact copolymers are distinctly different from conventional ethylene-propylene random copolymers which are typically polymerized in a single reactor, generally have a lower ethylene content (typically 0.5 wt % to 6 wt %) wherein the ethylene groups are randomly inserted by a catalyst along the polypropylene backbone chain, and do not comprise an ethylene-propylene rubber content. A suitable example of ethylene-propylene impact copolymer for the disclosed films is Total Petrochemical's 5571. Total Petrochemicals 5571 has a melt flow rate of about 7 g/10 minutes at 230° C., a melting point of about 160-165° C., a Vicat softening point of about 148° C., and a density of about 0.905 g/cm$^3$. Another example of ethylene-propylene impact copolymer can be Total Petrochemical's 4180 with a melt flow rate of about 0.7 g/10 minutes at 230° C., a melting point of about 160-165° C., a Vicat softening point of about 150° C., and a density of about 0.905 g/cm$^3$. Other suitable ethylene-propylene impact copolymers can be Sunoco Chemical's TI-4015-F2 with a melt flow rate of 1.6 g/10 minutes at 230° C. and a density of about 0.901 g/cm$^3$ and ExxonMobil Chemical's PP7033E2 with a melt flow rate of about 8 g/10 minutes at at 230° C. and a density of about 0.9 g/cm$^3$.

Isotactic propylene homopolymers, copolymers, and blends thereof are particularly preferred for the disclosed films. Other polyolefins that could also be considered, however, are ethylene homopolymers such as high density polyethylene, medium density polyethylene, low density polyethylene, and linear low density polyethylenes. These ethylene homopolymers may also be blended with ethylene copolymers, propylene copolymers, and/or propylene homopolymers. Among these types, high density polyethylenes (HDPE) are preferred, such as Total Petrochemical's HDPE 9658 (density 0.958 g/cc, MI 0.64 g/10 min), or Total Petrochemical HDPE 9458 (density 0.958 g/cc, MI 0.45 g/10 min), or Total Petrochemical HDPE 9260 (density 0.960 g/cc, MI 2.0 g/10 min).

In addition, these isotactic crystalline propylene-based resins may also include additives such as antiblocking agents and/or slip agents. An amount of inorganic antiblocking agent may be optionally added up to 10,000 ppm to the film layer(s) as desired for film-handling purposes, winding, antiblocking properties, and control of coefficient of friction. Preferably about 300-5000 ppm, and more preferably about 300-1000 ppm, of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 um, preferably in the range of 2-6 um. Slip agents such as fatty amides and/or silicone oils can also be optionally employed in either or both film layers, either with or without the inorganic antiblocking additives, to aid further with controlling coefficient of friction and web handling issues. Such slip agents are typically migratory and bloom to the surface of the film. Suitable types of fatty amides are those such as stearamide or erucamide and similar types, in amounts of 100-5000 ppm of the layer. Preferably, erucamide can be used at 500-1000 ppm of the layer. A suitable silicone oil that can be used is a low molecular weight oil of 350 centistokes which blooms to the surface readily at a loading of 400-600 ppm of either or both layers. Antiblock and slip agents can be conveniently used in the form of masterbatches at desired loadings for economy and using desired carrier resins.

The formation of a plurality of closed cell voids within the disclosed films can be critical to imparting the tear resistance of said films. Preferably, the main layer (also known as the base layer or core layer) can be the voided layer of a mono-layer or multi-layer embodiment as this layer is typically the thickest layer and comprises the bulk mass of the film. However, in multi-layer film embodiments, the coextruded "skin" layers adjacent to the core layer (either on one side of the core layer or on both sides of the core layer) could be the voided layer(s) in place of the core layer or both the skin layers and core layer could be voided. Voids may be formed within the respective film layer through cavitation by using inorganic or organic cavitating agents well known in the art. Such inorganic cavitating agents can be: calcium carbonate ($CaCO_3$), titanium dioxide ($TiO_2$), silica or silicate particles, glass micro-beads, or other inorganic particulates and/or minerals. Preferred inorganic cavitating agents can be calcium carbonate particles due to its popularity as well as economy. Particle diameter sizes of the inorganic cavitating agents can be in the range of about 0.1-2.0 μm. Typical loadings of the inorganic cavitating agents can be about 1-10 wt % of the layer, preferably about 2-5 wt %. Organic cavitating agents can be used as well, such as polybutylene terephthalate, polycarbonate, nylon, polymethylmethacrylate, polystyrene. Typically, such polymeric cavitating agents have a higher Tg than the propylene-based bulk resin of the disclosed films. Typical loadings of organic cavitating agents can be about 1-10 wt % of the layer.

After die-casting the film and quenching, voids or cavities can be formed by orientation of the film in the machine direction. Without being bound by any theory, such stretching or orientation at certain processing temperatures can form stress points about the cavitating agent particles, resulting in a plurality of closed cell voids or cavities. These voids will typically contain the cavitating agent particle within the void.

A preferred method to produce the voided films disclosed herein can be to use a chemical foaming agent (CFA) as the cavitating or voiding agent. Such chemical foaming agents degrade under the polymer processing extrusion temperatures, thereby liberating gases within the polymer melt. Upon exit from the melt pipe and die, the entrapped gases can expand, thereby forming a foamed film layer with a plurality of closed cell voids. The decomposition of the CFA can be either exothermic or endothermic. Exothermic CFAs release energy during decomposition and can include hydrazines and azo compounds. Such compounds can be characteristically yellowish in color and should be handled with care to avoid skin irritation. Endothermic CFAs consume energy during decomposition, thus requiring continuous energy input during the full reaction time and can be usually based on bicarbonate and citric acid powders. Such derivatives are also used as food additives, are safer to handle, and can be preferred for this reason. In the case of using CFAs to form the voided film layer, such voids will typically not contain a solid particle within the void or cavity in contrast to using inorganic or polymeric cavitating agents. The amount of CFA to use in the core layer of the voided film disclosed herein can be in the range of about 0.2-3.0 wt % of the layer, preferably 0.3-1.0 wt %, and more preferably 0.4-0.6 wt %. Such chemical foaming agents may be dry-blended as-is or as a masterbatch with the polyolefin resin pellets prior to melt extrusion.

Suitable chemical foaming agents may be obtained from Bergan International under their Foamazol™ brand name, in particular, grade Foamazol™ 63. Foamazol™ 63 is an endothermic-type CFA, with a melting point of about 110-130° C. and bulk density of about 42 lb/ft$^3$ (0.673 g/cm$^3$). Another suitable endothermic chemical foaming agent may be obtained from Clariant under their Hydrocerol™ brand name, in particular, grade PEAN698596 masterbatch, with a melting point of about 104-115° C. and masterbatch specific gravity of about 0.91-0.97.

Figure 2:
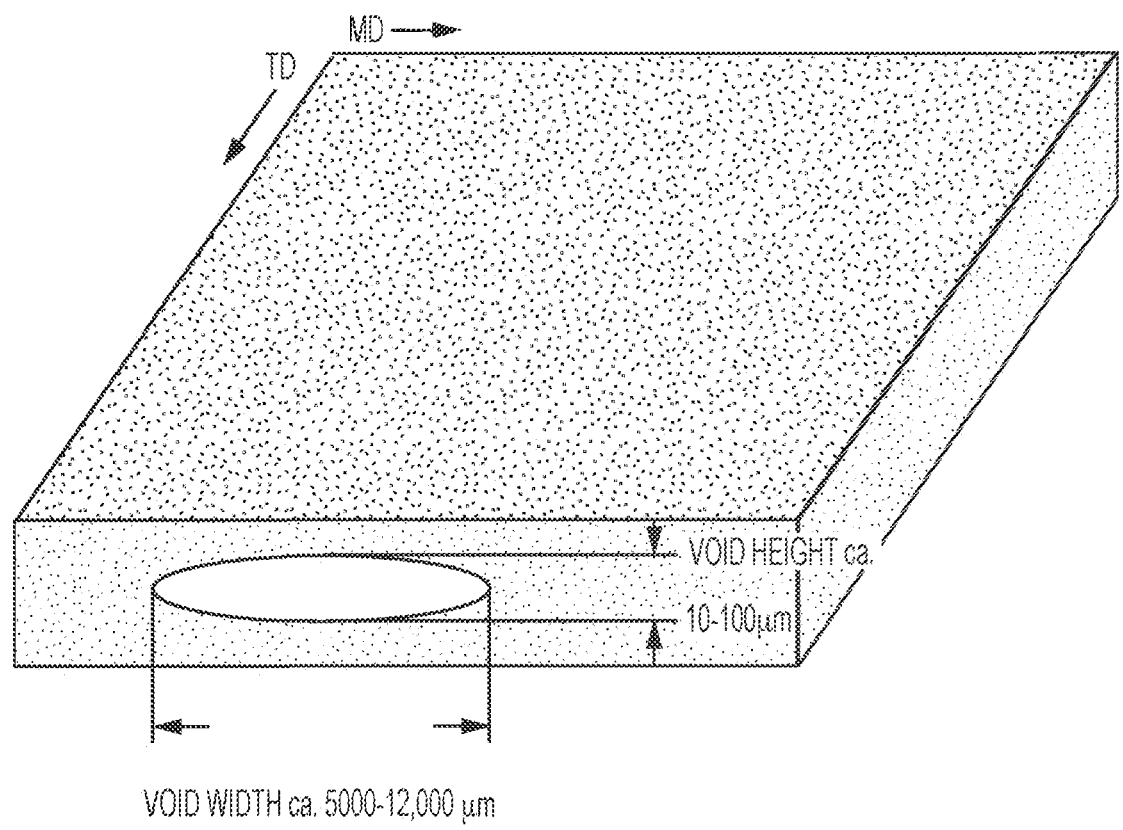
FIG. 2 is an illustration of the void's dimensions within an embodiment of a mono-axially oriented polyolefin film that exhibits tear resistance.

The films disclosed herein can be made by dry-blending the component resins and materials (e.g. propylene-based polymer blends, chemical foaming agent, antiblock additives, and other optional additives such a colorants) and melt-extruded them through a die at extrusion temperatures of about 390-465° F. (199-240° C.). The die temperature can be about 295-385° F. (146-196° C.). The films can also be cast on a chill drum at about 130° F. (54° C.) and a casting speed of about 38.5 fpm (12 mpm). In addition, the films can also be oriented in the machine direction (MD) via a series of heated and differentially sped rolls at about 270-280° F. (132-138° C.) for the preheat section, and about 205° F. (96° C.) for the stretching section. The films can be heat-set or annealed in the final zones of the MD orientation section at about 280° F. (138° C.) to reduce internal stresses, minimize heat shrinkage of the film, and maintain a thermally dimensionally stable mono-axially oriented film. The machine direction mono-axial orientation ratio can be about 4.0-7.0:1.0, meaning that the film was stretched in the machine direction at about 4-7 times its original dimension at casting; about 5.0-7.0:1.0; or about 6.0-7.0:1.0. Preferably, machine direction orientation can be about 6.5:1.0. Production linespeed after MD orientation at 6.5:1.0 can be about 250 fpm (76 mpm). Typical total thickness of the disclosed films after orientation (and foaming) can range from about 2.0 to 10.0 mil (200-1000 G or 50-250 µm) or about 3.0-5.0 mil in thickness. Density of the foamed film can range from about 0.60-0.89 g/cm$^3$, preferred about 0.60-0.80 g/cm$^3$, and more preferably about 0.64-0.78 g/cm$^3$. Average void sizes can range from about 5000-12,000 µm in width (along the MD axis), preferably greater than 6000 µm width, and more preferably 8000 µm or greater; and about 10-100 µm in height as depicted in FIG. 2. Uniformity of the voids within the film is desirable and can be characterized by measuring the standard deviation of the voids' average width in a representative sample. The preferred standard deviation of the average void width can be about 2000 µm or less, and preferably, 1500 µm or less.

The films disclosed herein may also be discharge-treated on one or both sides of the film using methods well-known in the art such as corona or flame or atmospheric plasma. In addition, other methods after MD orientation can be used in order to raise the wetting tension of the film on one or both sides of the film. Preferably, the film can be treated on both sides. Furthermore, the mono-oriented polypropylene-based (MOPP) film can be wound in roll form.

The following is a list of materials that were used in the Examples provided herein:

Materials:
Total Petrochemicals 3274 isotactic crystalline propylene homopolymer: melt flow rate 1.5 g/10 min at 230° C., melting point 163° C., and density 0.905 g/cm$^3$ Braskem TI4015F propylene-based impact copolymer: melt flow rate 1.6 g/10 minutes at 230° C. and density 0.901 g/cm$^3$ Total Petrochemicals 3576XHD isotactic crystalline propylene homopolymer, containing ca. 5000 ppm Silton® JC-30 sodium calcium aluminum silicate antiblock particles of nominal 3.0 µm diameter: melt flow rate 8.0 g/10 min at 230° C. and density 0.905 g/cm$^3$ Bergan International Foamazol™ 63 chemical foaming agent masterbatch: melting point 110-130° C. and bulk density 42 lb/ft$^3$ Clariant Hydrocerol® PEAN698596 chemical foaming agent masterbatch (Optional) Ampacet Blue 463163: blue pigment masterbatch in propylene homopolymer carrier resin.

Example and Comparative Examples

Example 1

A single layer mono-axially oriented film (MOPP) was made using a ca. 1.5 m-wide mono-axial orientation film-making process with a blend comprising about 44.1 wt % Total 3274, about 49.0 wt % Braskem TI4015F, about 4.9 wt % Total 3276XHD, about 1.0 wt % Foamazol™ 63 masterbatch; and about 1.0 wt % of Ampacet Blue masterbatch (to impart an blue tint to the film for aesthetic purposes). A voided film was produced per the processing conditions described previously. Specifically, the film was dry-blended and melt-extruded through a die at extrusion temperatures of about 390-465° F. (199-240° C.); die temperature was about 295° F. (146° C.); cast on a chill drum at about 130° F. (54° C.) and a casting speed of about 38.5 fpm (12 mpm), and orientation in the machine direction (MD) via a series of heated and differentially sped rolls at about 270-280° F. (132-138° C.) for the preheat section, and about 205° F. (96° C.) for the stretching section. The film was heat-set or annealed in the final zones of the MD orientation section at about 280° F. (138° C.) to reduce internal stresses and minimize heat shrinkage of the film and maintain a thermally dimensionally stable mono-axially oriented film. The machine direction mono-axial orientation ratio was about 6.5:1.0, meaning that the film was stretched in the machine direction at about 6.5 times its original dimension at casting. Production linespeed after MD orientation was about 250 fpm (76 mpm).

The thickness of the film was about 2.7 mils (67.5 µm) thickness of extruded polyweight prior to foaming. After foaming/void formation and mono-axial orientation, the finished film thickness was about 5.0 mils (125 µm) thickness. Density of the film prior to foaming/voiding was ca. 0.905 g/cm$^3$ and after foaming/voiding the film density was ca. 0.60 g/cm$^3$.

Example 2

A film was made similar to Example 1 except that the extruded polyweight thickness of the film prior to foaming was about 2.8 mils (70 µm). After foaming and mono-axial orientation, the finished film thickness was about 5.2 mils (130 µm).

Example 3

A film was made similar to Example 1 except that Clariant PEAN698596 was used at about 2.0 wt % of the film. The amount of Total 3274 was about 43.6 wt %; the amount of Braskem TI4015F was about 48.5 wt %; the amount of Total 3576XHD was about 4.9 wt %; and about 1.0 wt % Ampacet Blue masterbatch was used. The extruded polyweight gauge prior to foaming/voiding was about 2.7 mils (70 μm). After foaming/void formulation, the finished film thickness was greater than 6.0 mils (125-150 μm).

Comparative Example 1

A film was made similar to Example 1 except that no chemical foaming agent was used. The composition was about 44.6 wt % Total 3274; about 49.5 wt % Braskem TI4015F; about 4.9 wt % Total 3576XHD; and about 1.0 wt % Ampacet Blue masterbatch. The finished film thickness after MD orientation was about 2.7 mils (67.5 μm).

The MOPP film roll Examples were then tested for optics (gloss and light transmission), wetting tension, COF, elongation, tensile strength, and tear resistance.

The following Tables 1A and 1B illustrates the properties of these Examples:

TABLE 1A

| Sample | TD Tear Resistance Rating (1 = best; 3 = poor) | MD Heat Shrinkage % (Thermal Dimensional Stability) | MD Tensile Strength lb/inch width | MD/TD Modulus kpsi | MD Elongation % | Appearance |
|---|---|---|---|---|---|---|
| Ex. 1 | 1 | <2.0 | 95 | 30.7 | 24 | Good |
| Ex. 2 | 1 | <2.0 | 100 | 31.3 | 24 | Good |
| Ex. 3 | 1 | NT^ | NT^ | NT^ | NT^ | Poor |
| CEx. 1 | 3 | <2.0 | 160 | 210 | 25 | Good |

TABLE 1B

| Sample | Light Transmission % | Gloss (60°) In/Out* | Wetting Tension Dyne-cm/cm² In/Out* | COF Out/Out* | COF In/In* |
|---|---|---|---|---|---|
| Ex. 1 | 30.8 | 39/32 | 42/42 | 0.49/0.41 | 0.57/0.48 |
| Ex. 2 | 29.7 | 42/33 | 42/42 | 0.48/0.38 | 0.56/0.46 |
| Ex. 3 | NT^ | NT^ | NT^ | NT^ | NT^ |
| CEx. 1 | 29.0 | 82/83 | 42/42 | 0.67/0.59 | 0.68/0.60 |

^Not tested due to poor quality of film appearance.
*"Out" refers to the side of the film that was in contact with the air side during casting; "In" refers to the side of the film that was in contact with the casting drum side during casting.

As Tables 1A and 1B show, Comparative Example 1 (CEx 1) was a un-foamed/un-voided control film. Appearance was very good and consistent with excellent MD tensile properties and low heat shrinkage. Gloss values of CEx. 1 were higher than that of the Examples due to a smoother surface since CEx. 1 was unvoided. Tensile properties were also higher than the Examples due to being an unvoided film. However, when a film sheet of CEx. 1 was torn by hand at a notch made in the transverse direction side of the film, tear resistance in the transverse direction (orthogonal to the orientation direction in the machine direction) was very poor in that tearing was initiated and propagated transversely across through the film very easily with little effort. Tear resistance property was rated 3 ("poor") where a rating of 1 ("excellent", no or little transverse tear through) or 2 ("good", some transverse tear through) is desirable. CEx1's transverse tear resistance was considered to be poor.

Example 1 (Ex 1) shows a film with about 1 wt % of the chemical foaming agent Foamazol™ 63 to void/foam/cavitate the film layer. Appearance was acceptable and MD tensile properties were good at 95 lb/in and 24% MD elongation. MD heat shrinkage was also very good at less than 2% shrinkage. This film showed excellent tear resistance in the transverse direction and was rated a 1.

Example 2 (Ex 2) showed a film that was similar to Ex. 1 but was extruded to be slightly thicker than Ex. 1 at nominal 5.2 mil (130 μm) vs. 5.0 mil (125 μm), respectively. Appearance was acceptable and MD tensile properties were very good at 100 lb/in and 24% MD elongation. MD heat shrinkage was also very good at less than 2% shrinkage. This film showed excellent tear resistance in the transverse direction and was rated a 1.

Example 3 (Ex 3) showed a film that used a different chemical foaming agent, 2 wt % of Hydrocerol® PEAN698596 instead of 1 wt % Foamazol™ 63. Unfortunately, void sizes using this foaming agent were very large, causing very poor appearance on the film's surface. Process modifications were made (MDO stretch temperatures) as well as different loadings of the foaming agent (0.5 wt %, 0.8 wt %, 1.0 wt %, and 2 wt %) in an attempt to control degree of foaming and void formation. Foaming could only be consistently done at the 2 wt % level (the lower levels exhibited little or no foaming). In this Example, the film was considered to be "over-foamed" with voids that were considered to be too large (bursting through outer surfaces of the film) and appearance was very poor. Cavitated or foamed thickness was also greater than desired, in excess of 6 mils (150 μm). For this reason, most of the standard testing was not conducted since no suitable or consistent enough film was made of this example. However, transverse tear resistance was tested and was found to be excellent despite the large void sizes and was rated a 1.

Examples 4 to 9

Additional Examples 4-9 were made similar to Example 1 but with varying amounts of Foamazol™ 63 of about 0.4 and 0.6 wt % of the core layer and machine direction orientation (MDX) of about 6.2:1.0 and 6.7:1.0. The extrusion temperature melt pipe was set at ca. 425° F. (218° C.) and die temperature was about 375° F. (190.5° C.). The extruded polyweight gauge of these single layer film Examples prior to foaming/voiding was about 2.85 mils (71.25 μm). After foaming/void formulation, the finished film thickness ranged from 3.0-4.0 mils (75-100 μm). Table 2A summarizes the formulations and conditions for these Examples.

TABLE 2A

| Example | Foamazol ™ wt % | Total Braskem 3274 wt % | Braskem TI4015 wt % | Total 3576XHD wt % | Ampacet 463163 wt % | MDX | Foamed Film Thickness mils (μm) |
|---|---|---|---|---|---|---|---|
| 4 | 0.4 | 44.6 | 49.0 | 5.0 | 1.0 | 6.2 | 3.0 (75) |
| 5 | 0.6 | 44.4 | 49.0 | 5.0 | 1.0 | 6.2 | 3.8 (95) |
| 6 | 0.4 | 44.6 | 49.0 | 5.0 | 1.0 | 6.7 | 3.0 (75) |
| 7 | 0.6 | 44.4 | 49.0 | 5.0 | 1.0 | 6.7 | 3.2 (80) |
| 8 | 0.6 | 44.4 | 49.0 | 5.0 | 1.0 | 6.2 | 3.5 (87.5) |
| 9 | 0.6 | 44.4 | 49.0 | 5.0 | 1.0 | 6.7 | 4.0 (100) |

Tables 2B and 2C summarize some of the properties tested for Examples 4-9. Average void width (measured along the longitudinal dimension), void uniformity (standard deviation of average void width), voided film density, tear resistance rating, and both machine direction (MD) and transverse direction (TD) tensile properties were tested.

TABLE 2B

| Example | Void Size μm | Void Uniformity μm | Film Density g/cm³ | Tear Resistance Rating 1-3 (1 = best; 3 = poor) |
|---|---|---|---|---|
| 4 | 6050 | 2093 | 0.838 | 3 |
| 5 | 8866 | 1522 | 0.642 | 1 |
| 6 | 1414 | NT | 0.882 | 3 |
| 7 | 10,662 | 1837 | 0.782 | 2 |
| 8 | 9189 | 1571 | 0.733 | 2 |
| 9 | 8185 | 371 | 0.637 | 1 |

| Example | MD Tensile Strength lbf/in | MD Modulus kpsi | MD Elongation % | TD Tensile Strength lbf/in | TD Modulus kpsi | TD Elongation % |
|---|---|---|---|---|---|---|
| 4 | 118.0 | 39.3 | 30.4 | 9.1 | 3.0 | 9.1 |
| 5 | 79.8 | 21.0 | 15.3 | 6.4 | 1.7 | 7.9 |
| 6 | 126.1 | 42.0 | 30.6 | 11.5 | 3.8 | 4.6 |
| 7 | 100.0 | 31.3 | 19.5 | 9.0 | 2.8 | 10.1 |
| 8 | 99.7 | 28.5 | 21.1 | 7.1 | 2.0 | 7.8 |
| 9 | 88.8 | 22.2 | 14.6 | 5.6 | 1.4 | 6.5 |

In Table 2B, Examples 5, 7, 8, and 9 showed the best tear resistance rating property, with ratings of at least a "2", indicating good resistance to transverse direction tear propagation. Examples 4 and 6 showed the poorest tear resistance property, with a rating of "3", indicating no or little resistance to transverse direction tear propagation. It is noted that the void sizes and uniformity for Examples 4 and 6 are significantly lower and worse, respectively, than that of Examples 5, 7-9. It is also noted that the voided film density of Examples 4 and 6 are significantly higher than that of Examples 5, 7-9. Without being bound by any theory, there appears to be a correlation between void size/uniformity, voided film density, and tear resistance property. Larger-sized voids and more uniform voids appear to be more favorable for tear resistance; lower voided film density also appears to correlate to more favorable tear resistance property. The exemplary films with good tear resistance appear to have larger and more uniform voids—and since they are more voided, these exemplary films will have a lower density. Poor tear resistance disclosed films will have smaller (or no) voids; and consequently, their film density will be higher. Based on the results of Table 2B, void sizes of greater than about 6000 μm in width appear to be preferred for good transverse tear resistance properties; preferably, the void sizes should be about 8000 μm or more. In some embodiments, the void sizes are about 6000-12,000 μm or about 8000-12000 μm in width. Void uniformity should be less than about 2000 μm, and preferably about 1500 μm or less. Similarly, film density should be less than about 0.83 g/cm³, preferably less than 0.80, and more preferably, less than 0.70. MD tensile strengths for Examples 4-9 were good overall, in particular Examples 4, 6, 7, and 8. Similarly for MD modulus and elongation, Examples 4, 6, 7, and 8 showed the best values of this Example set. However, Examples 4 and 6 were poorest for tear resistance. Examples 7 and 8 showed a good balance of good tear resistance and good tensile properties.

Test Methods

The various properties in the above examples were measured by the following methods:

A) Tear Resistance: Tear resistance was tested qualitatively by notching a piece of test film on one edge of the transverse direction (or cross-width) side; and tearing by hand at the notch to initiate the tear. The notch was made parallel to the transverse direction of the test film with a pair of scissors with notch length approximately ¼ inch (ca. 6 mm) and the tear propagated along the transverse direction. The tear was initiated from the notch by hand and observation made as to the ease with which the tear could be propagated across the transverse width of the film. The preferred observation for good tear resistance property was: 1) tearing could not be initiated and could not be propagated transversely and tear propagation transferred to the machine direction only; 2) tearing was difficult to initiate and difficult to propagate transversely and tear propagation transferred to the machine direction only; 3) tearing was easily initiated and easily propagated in the transverse direction. Ratings were as follows:

1=No tear propagation or initiation in transverse direction
2=Some or difficulty in propagating tear in transverse direction
3=Easy to initiate and propagate tear in transverse direction B) Light Transmission of a single sheet of film was measured substantially in accordance with ASTM D1003. In some embodiments, the film has a light transmission of about 10-50%, 20-40%, or about 20-30%.

C) Gloss was conducted on both sides of a single sheet of film and was measured substantially in accordance with ASTM D2457. In some embodiments, the film has a gloss of 20 or greater.

D) COF was conducted on both sides of a single sheet of film and was measured substantially in accordance with ASTM D1894. In some embodiments, the film has a COF of about 0.2-1.0 or about 0.3-0.7.

E) Tensile Properties: Modulus, Tensile Strength, Elongation was conducted in the MD and/or TD direction of the film substantially in accordance with ASTM D882. In some embodiments, the film can have an MD and/or TD tensile strength of at least about 75 lb/in or at least about 90 lb/in. In some embodiments, the film can have an MD and/or TD modulus of at least about 20 kpsi or at least about 30 kpsi. In some embodiments, the film can have an MD and/or TD elongation of at least about 10% or of at least about 15%.

F) Thermal Dimensional Stability (i.e., Heat Shrinkage) was tested by cutting a strip of the film 1 inch-wide in the transverse direction by 50 inches long in the MD direction. This strip was then immersed in 100° C. water for 10 minutes. After this immersion time, the film strip was removed, dried with paper towels, and measured again along the MD direction. The percent change in dimension from the original MD length was recorded.

G) Wetting Tension was measured on the discharge-treated side(s) of the film substantially in accordance with ASTM 2578-67. In some embodiments, the film can have a wetting tension of at least about 36 dynes. In some embodiments, the film can have a wetting tension of about 39-42 dynes.

H) Appearance: Appearance of the film was observed qualitatively. In essence, exemplary films that were consistent in appearance were considered acceptable; films that were very inconsistent in appearance were considered to be poor.

I) Void Size and Void Uniformity: Cross-sections of 3 representative film samples per Example were taken parallel to the MD direction of the film (orthoganally to the transverse direction of the film) and examined via a digital optical microscope (Keyance model VHX). Magnification was 30× and the samples were backlit with polarized light to make the voids more easily observable. Imaging software integrated with the Keyance digital microscope was used to measure the number of voids and void sizes in the field of view. The average size and standard deviation were calculated and reported. Void size is defined as the average dimensional width of the voids and void uniformity is defined as the standard deviation of the average void widths.

J) Film Density: Density of the film was calculated by taking a stack of 10 sheets (letter paper size e.g. 8.5 inches by 11 inches) of film and cutting them via a die or template of area 33.69 cm$^2$ and weighing said cut sheets on an analytical scale. The 10 sheets are also measured for thickness using a flat-head micrometer to get an average thickness of the film. The measured weight and thickness is then used in a calculation to obtain density:

$$\frac{\text{Weight (g)}}{\text{Thickness (cm)} \times \text{area (cm}^2\text{)}} = \text{Density (g/cm}^3\text{)}$$

This application discloses several numerical ranges. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A method of making a mono-axially oriented polyolefin film comprising:
    extruding a film comprising a layer, wherein the layer comprises a propylene-based polyolefin and a voiding agent, wherein the voiding agent is a chemical foaming agent;
    orienting the film at least 4 times in the machine direction (MD) to form a mono-axially, oriented polyolefin film, wherein the mono-axially, oriented polyolefin film has a plurality of voids with an average void size of 5,000-12,000 μm in width along the MD axis.

2. The method of claim 1, further comprising heat setting the extruded film.

3. The method of claim 1, further comprising co-extruding at least one skin layer with the layer.

4. The method of claim 3, wherein the at least one skin layer does not include a voiding agent.

5. The method of claim 1, wherein the mono-axially oriented polyolefin film is a monolayer film.

6. The method of claim 1, wherein the chemical foaming agent comprises 0.2-3 wt. % of the layer.

7. The method of claim 1, wherein the density of the mono-axially oriented polyolefin film is 0.60-0.89 g/cm$^3$.

8. The method of claim 1, wherein the standard deviation of the average void width is 2000 μm or less.

9. The method of claim 1, wherein the film has a thickness of 1.5-10 mil before foaming.

10. The method of claim 1, wherein the film has a thickness of 2.5-18.5 mil after foaming.

11. The method of claim 1, wherein the voiding agent comprises 1-10 wt. % of the layer.

12. The method of claim 11, wherein the voiding agent comprises $CaCO_3$, $TiO_2$, silica particles, or glass microbeads inorganic void particles.

13. The method of claim 11, wherein the voiding agent comprises polybutylene terephthalate, nylon, polycarbonate, polystyrene, or polymethlymethacrylate.

14. The method of claim 11, wherein the voiding agent comprises a beta-nucleation of a propylene-based polymer.

15. The method of claim 1, wherein the mono-axially oriented polyolefin film has a tensile strength of 80-120 lbs/inch width.

16. The method of claim 1, wherein the mono-axially oriented polyolefin film has a machine direction heat shrinkage of less than 2%.

17. The method of claim 1, wherein the mono-axially oriented polyolefin film has a light transmission of 20-40%.

* * * * *